Sept. 21, 1948.    J. D. FORNEY    2,449,649
WELDING TRANSFORMER
Filed Oct. 8, 1945

INVENTOR.
J. D. FORNEY
BY
Martin E. Anderson
ATTORNEY

Patented Sept. 21, 1948

2,449,649

UNITED STATES PATENT OFFICE 2,449,649

WELDING TRANSFORMER

James Donovan Forney, Fort Collins, Colo.

Application October 8, 1945, Serial No. 621,146

1 Claim. (Cl. 171—119(777))

This invention relates to improvements in welding transformers.

In electro-welding, alternating current of low voltage but high amperage is usually employed. It has been found that it is desirable for the operator to be able to vary the voltage and the welding current during the welding operation.

It is known that welding transformers and generators have been made that can be adjusted manually, but such generators require the operator to leave his work to effect the adjustments.

It is the object of this invention to produce a welding transformer of such construction and provided with such adjusting means that the operator can effect the voltage and current adjustments without leaving his work and without stopping the welding operation.

In most instances the welding generators or transformers are positioned a considerable distance from the work and the low voltage current is conducted to the work by flexible insulated conductors, one of which is connected with the electrode and the other with the work that is operated on.

It is the object of this invention to produce a welding generator having an adjusting means that can be operated by exerting a pull on the live conductor or on the ground conductor for either increasing or decreasing the secondary voltage and the welding current.

The construction and operation of an alternating current transformer is well known and well understood and briefly described consists of a magnetic core on which are positioned a primary winding and a secondary winding. The core is usually continuous and therefore the same number of lines of force cut both coils. Since the voltage is a direct function of the number of lines of force and the number of turns, it is evident that the voltage in the primary and in the secondary bear the same relation as the number of turns. It is therefore possible to reduce the voltage to any extent desired.

Since the primary windings are usually energized from a constant voltage source and have circuits of constant resistance and reactance, the primary winding generates a certain number of lines of force at all times. Where the magnetic circuit is continuous, the same number of lines of force cut the primary and secondary windings. Since the voltage generated in the secondary depends upon the number of lines of force by which it is cut, per unit of time, the voltage can be decreased by providing the magnetic circuit with a by-pass or shunt that will divert some of the lines from the secondary core. The proportion of lines of force that pass through the secondary core and the shunt are inversely proportionate to the magnetic reluctance of the two paths. Since an air gap has a very high reluctance compared to a soft iron path, such magnetic shunts are provided with a mechanism by which the air gap can be adjusted.

It is the object of this invention to provide a welding transformer with a variable magnetic reluctance by-pass of such construction that it can be adjusted by the welder either to increase or decrease the length of an air gap by merely exerting a pull on the conductors from the secondary.

Having thus, in a general way, described the objects of the invention and the invention itself, reference will now be had to the accompanying drawing in which the invention has been illustrated in its preferred form, and in which.

Figure 1:
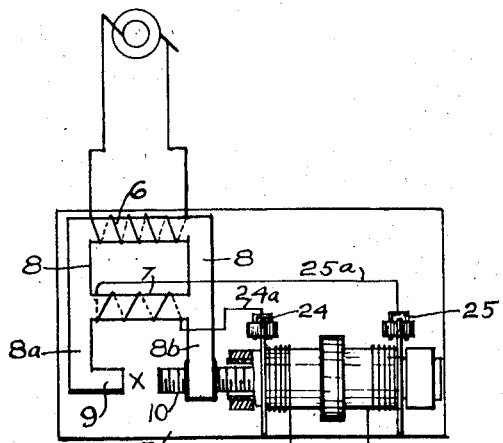
Figure 1 is a diagrammatic plan view showing a welding transformer provided with an adjustable air gap and means for adjusting the length of the air gap.
Figure 2:
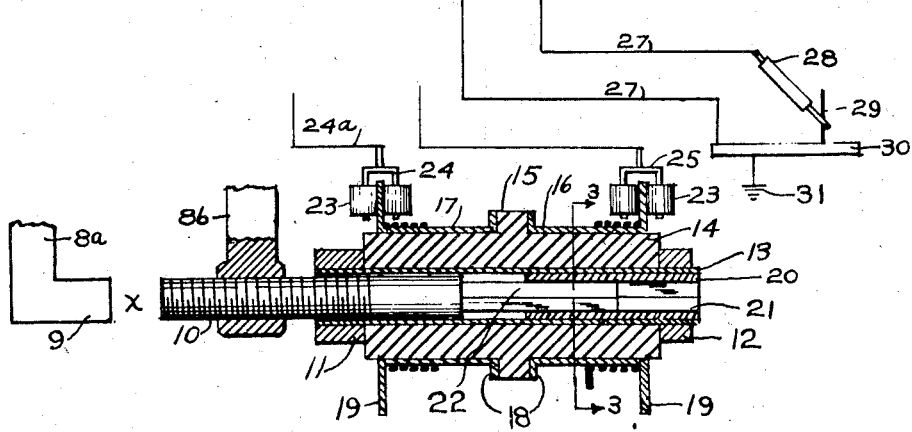
Figure 2 is a diametrical section through the air gap adjusting means, taken on a plane parallel to the paper in Figure 1.
Figure 3:
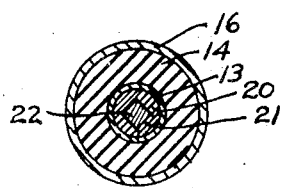
Figure 3 is a section taken on line 3—3, Figure 2.

In the drawing reference numeral 5 designates a base on which the transformer and the air gap adjusting means are positioned and by which they are supported. The transformer comprises a core of soft iron having a primary core 6 and a secondary core 7 connected by the sides 8. Extending from the ends of the secondary core are arms 8a and 8b. Arm 8a has been shown as provided with a lateral extension 9. Arm 8b has been shown as provided with a lateral extension 9. Arm 8b has an opening in which is positioned a soft iron screw or bolt 10, which has a threaded connection with the inner wall of the opening. Supported from the base are two bearings 11 and 12 and mounted for rotation in these bearings is a double drum comprising a tubular shaft 13, which is journaled in the bearings. Secured on the shaft is a cylinder 14 of non-conducting material. This cylinder has been shown as provided with a central outwardly extending flange 15. Metal spools 16 and 17 are secured to the drum, as shown in Figure 2. In the embodiment illustrated, the drum flanges 18 are somewhat narrower than the flanges 19. Positioned within the tubular shaft 13 is a cylindrical sleeve 20 having a rectangular opening 21. Member 20 is connected with the shaft by being electro-welded or soldered thereto so as to form a substantially integral part thereof. Screw 10 has a square end 22, which fits in the square opening of sleeve 20. Attached to the base by suitable means are two pair of rollers 23, each pair embraces a flange 19 of one of the spools. The U-shaped members that have been designated by reference numerals 24 and 25 are provided with spring arms so as to urge the rollers against the opposite surfaces of the flange. Extending from member 24 is a conductor 24a that connects with one end of the secondary winding and similarly a conductor 25a connects the other end of the secondary winding with member 25. Wound on the spools are electrically insulated conductors 26 and 27. The end of each conductor is soldered to a spool or electrically connected with it by suitable means. Conductors 26 and 27 are wound onto the spools in opposite directions so that when one conductor is unwound from the spool, the other will be wound thereon. Conductor 27 extends to an electrode holder 28 and this, in turn, carries an electrode 29 that contacts the work 30. Conductor 26 will be referred to as the ground wire and this is connected directly with the work. In the drawing the work has been shown as grounded at point 31, but an actual ground may be dispensed with when conductor 26 is employed. The air gap X is adjusted for an average voltage and by rotating the drum, which, in turn rotates the screw 10, the air gap may be increased or decreased in length thereby varying the number of lines of force that pass through the secondary coil. The welder may be a long distance away from the transformer, but by exerting a suitable pull on either one of wires 26 and 27 he can adjust the air gap and the voltage of the secondary winding. The specific embodiment shown and described is illustrative of means and may be replaced by any mechanical equivalent falling within the scope of the claim.

Having described the invention, what is claimed as new is:

In an adjustable welding transformer having a primary and a secondary core and a magnetic shunt about the secondary core, said shunt comprising an air gap, one of the poles of the air gap having a threaded opening, a threaded member of magnetic material positioned in the opening in operative engagement with the threads in the sides thereof, whereby when said member is rotated its end will move relative to the other pole, a drum mounted on the outer end of the magnetic member and interconnected therewith by means permitting relative axial movement but preventing relative rotary movement, two flanges of electrically conducting material secured to the drum in spaced relation, an electrical conductor connected to each flange and wound around the conductor in opposite directions, whereby the drum can be rotated in either direction by means of said conductors, a winding on the secondary core, and a stationary conductor in electrical contact with each flange, the ends of the secondary winding being electrically connected with the stationary contacts.

JAMES DONOVAN FORNEY.

REFERENCES CITED

The following references are of record in the file of this patent:

UNITED STATES PATENTS

| Number | Name | Date |
|---|---|---|
| Re. 16,012 | Holslag | Mar. 3, 1925 |
| 1,215,979 | Pauly | Feb. 13, 1917 |
| 2,133,919 | Fries | Oct. 18, 1938 |

FOREIGN PATENTS

| Number | Country | Date |
|---|---|---|
| 206,499 | Germany | Feb. 8, 1909 |